United States Patent
Mylius et al.

(10) Patent No.: US 9,223,577 B2
(45) Date of Patent: Dec. 29, 2015

(54) PROCESSING MULTI-DESTINATION INSTRUCTION IN PIPELINE BY SPLITTING FOR SINGLE DESTINATION OPERATIONS STAGE AND MERGING FOR OPCODE EXECUTION OPERATIONS STAGE

(71) Applicant: Apple Inc., Cupertino, CA (US)

(72) Inventors: John H. Mylius, Gilroy, CA (US); Gerard R. Williams, III, Los Altos, CA (US); James B. Keller, Redwood City, CA (US); Fang Liu, Sunnyvale, CA (US); Shyam Sundar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 661 days.

(21) Appl. No.: 13/627,884

(22) Filed: Sep. 26, 2012

(65) Prior Publication Data
US 2014/0089638 A1 Mar. 27, 2014

(51) Int. Cl.
*G06F 9/345* (2006.01)
*G06F 9/38* (2006.01)
*G06F 9/30* (2006.01)

(52) U.S. Cl.
CPC ............ *G06F 9/3017* (2013.01); *G06F 9/3016* (2013.01); *G06F 9/30138* (2013.01); *G06F 9/345* (2013.01); *G06F 9/384* (2013.01); *G06F 9/3861* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 6,122,725 A * | 9/2000 | Roussel et al. | 712/200 |
| 6,889,318 B1 * | 5/2005 | Wichman | 712/226 |
| 7,051,190 B2 | 5/2006 | Samra et al. | |
| 2005/0081017 A1 | 4/2005 | Rupley, II et al. | |
| 2005/0240866 A1 | 10/2005 | Berstis et al. | |
| 2007/0260855 A1 | 11/2007 | Gschwind et al. | |

* cited by examiner

*Primary Examiner* — Kenneth Kim
(74) *Attorney, Agent, or Firm* — Meyertons, Hood, Kivlin, Kowert & Goetzel, P.C.

(57) ABSTRACT

Various techniques for processing instructions that specify multiple destinations. A first portion of a processor pipeline is configured to split a multi-destination instruction into a plurality of single-destination operations. A second portion of the pipeline is configured to process the plurality of single-destination operations. A third portion of the pipeline is configured to merge the plurality of single-destination operations into one or more multi-destination operations. The one or more multi-destination operations may be performed. The first portion of the pipeline may include a decode unit. The second portion of the pipeline may include a map unit, which may in turn include circuitry configured to maintain a list of free architectural registers and a mapping table that maps physical registers to architectural registers. The third portion of the pipeline may comprise a dispatch unit. In some embodiments, this may provide certain advantages such as reduced area and/or power consumption.

23 Claims, 6 Drawing Sheets

300

```
┌─────────────────────────────────────────────────────────────┐
│ Split multi-destination instruction into a plurality of      │
│ single-destination operations in a first pipeline portion    │
│                          310                                 │
└─────────────────────────────────────────────────────────────┘
                              │
                              ▼
┌─────────────────────────────────────────────────────────────┐
│ Separately process the plurality of single-destination       │
│ operations in a second pipeline portion                      │
│                          320                                 │
└─────────────────────────────────────────────────────────────┘
                              │
                              ▼
┌─────────────────────────────────────────────────────────────┐
│ Merge the plurality of single-destination operations into a  │
│ single multi-destination operation                           │
│                          330                                 │
└─────────────────────────────────────────────────────────────┘
```

```
┌─────────────────────────────────────────────────────────────┐
│ Split multi-destination instruction into N single-destination│
│ operations in a first pipeline portion, where N > 1          │
│                          360                                 │
└─────────────────────────────────────────────────────────────┘
                              │
                              ▼
┌─────────────────────────────────────────────────────────────┐
│ Separately process the N single-destination operations in a  │
│ second pipeline portion                                      │
│                          370                                 │
└─────────────────────────────────────────────────────────────┘
                              │
                              ▼
┌─────────────────────────────────────────────────────────────┐
│ Merge the N single-destination operations into M multi-      │
│ destination operations where 1 <= M < N                      │
│                          380                                 │
└─────────────────────────────────────────────────────────────┘
```

FIG. 3b

PROCESSING MULTI-DESTINATION INSTRUCTION IN PIPELINE BY SPLITTING FOR SINGLE DESTINATION OPERATIONS STAGE AND MERGING FOR OPCODE EXECUTION OPERATIONS STAGE

BACKGROUND

1. Technical Field

This disclosure relates generally to computer processors, and more particularly to processing instructions that specify multiple destinations.

2. Description of the Related Art

Instruction set architectures for modern processors often include multi-destination instructions. Such instructions may specify multiple destination registers in which a processor should store instruction results. For example, the ARM® instruction set architecture includes long multiply instructions such as UMULL, UMLAL, SMULL, and SMLAL that include two destination register fields in each instruction to indicate where the processor should store a multiply result. Similarly, load-multiple instructions such as ARM® LDM instructions and POWERPC® LMW instructions, for example, indicate a number of destination registers that a processor should load with data from one or more specified memory addresses. Handling multi-destination instructions may require extra hardware in a processor pipeline and/or may slow processor performance.

SUMMARY

This disclosure relates to processing multi-destination instructions. In one embodiment, a first portion of a pipeline of a processing element may split a multi-destination instruction into a plurality of single-destination operations. A second portion of the pipeline may process the plurality of single-destination operations. The plurality of single-destination operations may be merged into one or more multi-destination operations that are available for further processing.

In one embodiment, the one or more multi-destination operations may be performed by an execution subsystem of the processing element. In some embodiments, such processing of multi-destination instructions may reduce processor area and/or power consumption. Long multiply and load-multiple instructions are examples of multi-destination instructions.

As a non-limiting example, in one embodiment, a multi-destination instruction is decoded into a plurality of single destination operations at a decode unit. In this exemplary embodiment, a map unit and/or other pipeline elements may process the plurality of single-destination operations. In this embodiment, a dispatch unit merges the plurality of single-destination operations. In one embodiment, the dispatch unit merges the plurality of single-destination operations into one multi-destination operation. In another embodiment, the dispatch unit merges the plurality of single-destination operations into a plurality of multi-destination operations. In one embodiment a reorder buffer includes entries for the plurality of single-destination operations.

BRIEF DESCRIPTION OF THE DRAWINGS

FIGS. 3a and 3b are flow diagrams illustrating respective exemplary embodiments of methods for processing multi-destination instructions;

Figure 1A:
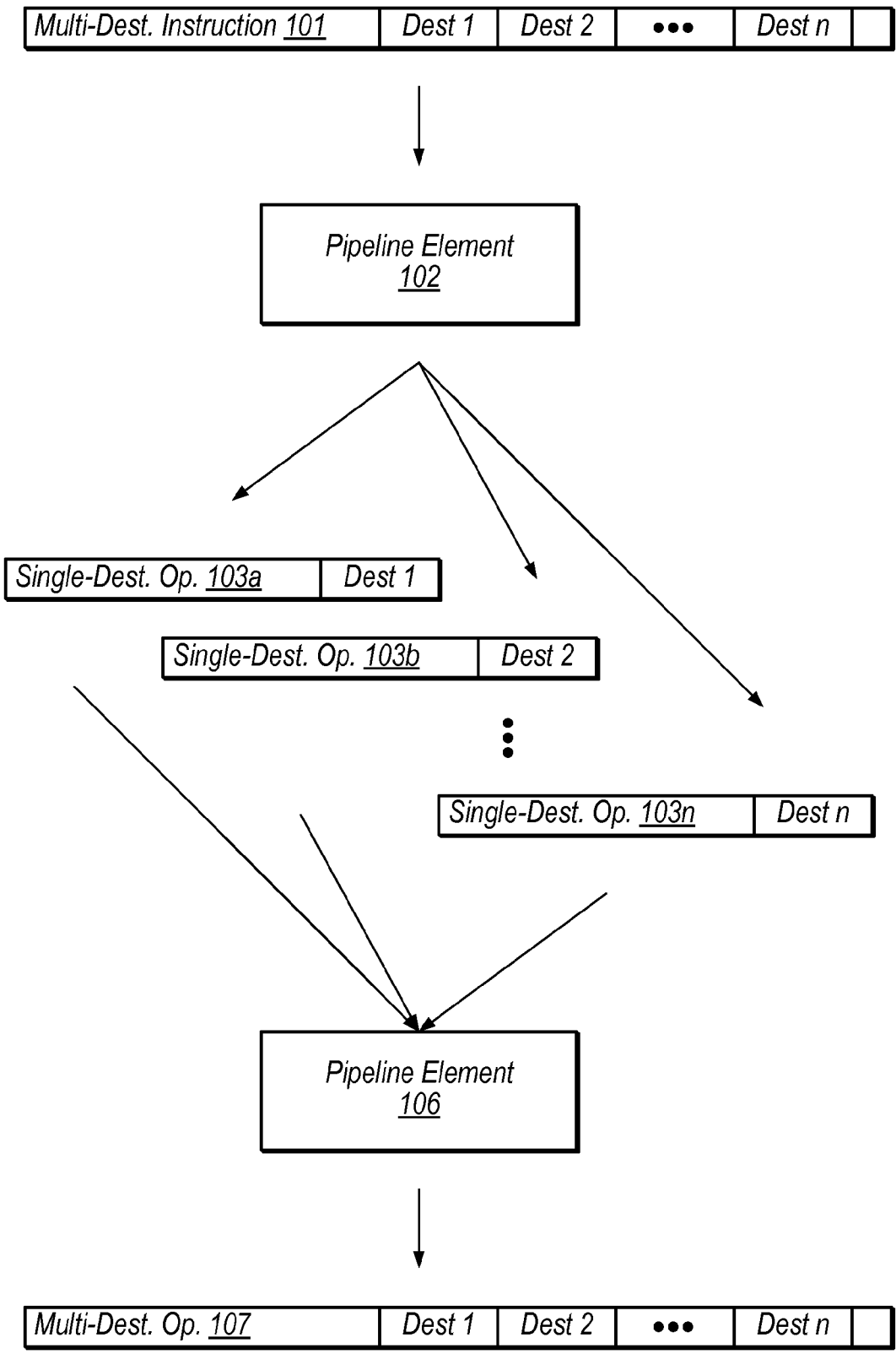
FIG. 1a is a diagram illustrating exemplary processing of a multi-destination instruction.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

Further, as used herein, the terms "first," "second," "third," etc. do not necessarily imply a ordering (e.g., temporal) between elements. For example, a reference to a "first" portion of a processor pipeline and a "second" portion of a processor pipeline refer to any two different portions of the pipeline.

Various elements are indicated in this disclosure as being "configured to" perform one or more tasks. As used herein, the term "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

This disclosure includes various techniques for processing instructions that specify multiple destinations (i.e., "multi-destination" instructions). Destinations may be destination registers; a multiply instruction may store its results in two destination registers, for example.

Handling multi-destination instructions may require extra hardware in a processor pipeline. The concept of a processor "pipeline" is well understood, and refers to the concept of splitting the "work" a processor performs on instructions into multiple stages. In one embodiment, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction and/or operations associated with the instruction on to other stages for further processing.

For example, a mapping unit in an out-of-order processor may rename a multi-destination instruction's destination architectural registers by mapping them to physical registers. The term "architectural register" refers to registers defined by an instruction set architecture, while the term "physical register" refers to actual hardware registers within a processing element. At different points in time, a given architectural register may correspond (be mapped) to different physical registers. A mapping unit within a processor may maintain a mapping table and a free list. In one embodiment, the mapping table is used to store a current relationship between architectural registers and physical registers to which they are mapped. The free list may reflect the availability of physical registers in a physical register space.

In order to support multi-destination instructions, e.g., instructions having N destination registers, a mapping unit may require N times as many write/read ports on the mapping table in order to map/unmap N destination registers at a time for each operation compared to a mapping table for instructions having only a single destination. Similarly, a mapping unit may require N times as many read/write ports on the free list in order to obtain/free N physical registers at a time. The hardware required for such an approach, however, may waste power and area compared to pipeline elements that handle single-destination instructions and do not handle instructions with multiple destination registers.

For example, consider an exemplary map unit that is configured to map destination registers for four operations in a single processor cycle (this number may be desirable in order to increase the number of program instructions completed on average per cycle). In this example, in embodiments where map unit 120 is configured to process single-destination operations and not multi-destination operations, the free list may include only four read ports and four write ports and the mapping table may include only four read ports and four write ports. In contrast, if map unit 120 were configured to process multi-destination instructions with up to two destination registers, the free list and mapping table may each require eight read ports and eight write ports. Further, if map unit 120 were configured to process multi-destination instructions with up to N destination registers, the free list and mapping table may each require 4N read ports and 4N write ports.

Another approach to multi-destination instruction processing involves splitting a multi-destination operation into multiple single-destination operations (i.e., operations that specify a single destination) early in a processor pipeline (e.g., at a decode stage). However, this approach may reduce performance compared to using a pipeline that handles multi-destination instructions without splitting because performing each of the single-destination operations may slow execution of other operations.

Referring now to FIG. 1a, a diagram illustrating one exemplary embodiment of processing a multi-destination instruction is shown. Multi-destination instruction 101 indicates a plurality of destinations, illustrated as destination 1 through destination n. Multi-destination instruction 101 may be an instruction of a particular instruction set architecture and may be, for example, a load-multiple instruction that specifies multiple destination registers. In the illustrated embodiment, multi-destination instruction 101 arrives at processor pipeline element 102. Pipeline element 102 splits multi-destination instruction 101 into a plurality of single-destination operations 103a-103n which may be collectively referred to as single-destination operations 103. The single-destination operations 103 each specify a single destination corresponding to one of the destinations of multi-destination instruction 101. In various embodiments, the single-destination operations may specify one or more various operations, such as load, store, multiply, add, and so on. In this embodiment, the single-destination operations 103 are processed in a processor pipeline before arriving at pipeline element 106. In some embodiments, single-destination operations 103 can be said to be processed "separately" from one another within the processor pipeline. This phrase includes embodiments in which single-destination operations are processed by different blocks of circuitry, or in which single-destination operations are processed by the same block of circuitry at different times. Note that separately processing single-destination operations may include, in certain embodiments, processing each of the single-destination operations in parallel using different circuitry. More generally, separate processing refers to the fact that the processor pipeline treats certain single-destination operations as discrete entities (as opposed, for example, to issuing a single command within the processor pipeline that has the effect of causing various single-destination operations to occur). Processing single-destination operations 103 separately may simplify pipeline hardware, resulting in reduced power consumption and/or area in a processing pipeline.

In the illustrated embodiment, pipeline element 106 merges the single-destination operations 103 into a single multi-destination operation 107 that is available for further processing. In another embodiment, pipeline element 106 merges the single destination operations 103 into a plurality of multi-destination operations. An execution subsystem may perform multi-destination operation 107. Performing the merged multi-destination operation 107 (or a plurality of merged multi-destination operations) instead of the single-destination operations 103 may improve execution efficiency.

In one embodiment, pipeline element 102 is a decode unit that is configured to identify the nature of an instruction (e.g., as specified by its opcode) and pipeline element 106 is a dispatch unit that is configured to dispatch or schedule instructions that are ready for performance. In one embodiment, a mapping unit separately processes the single-destination operations 103. In various embodiments, various other processing elements may split, merge, and/or process single-destination operations and/or multi-destination operations. As used herein, the term "processing element" may refer to various elements or combinations of elements. Processing elements may include, for example, portions or circuits of individual processor cores, entire processor cores, individual processors, and/or larger portions of systems that include multiple processors.

Figure 1B:
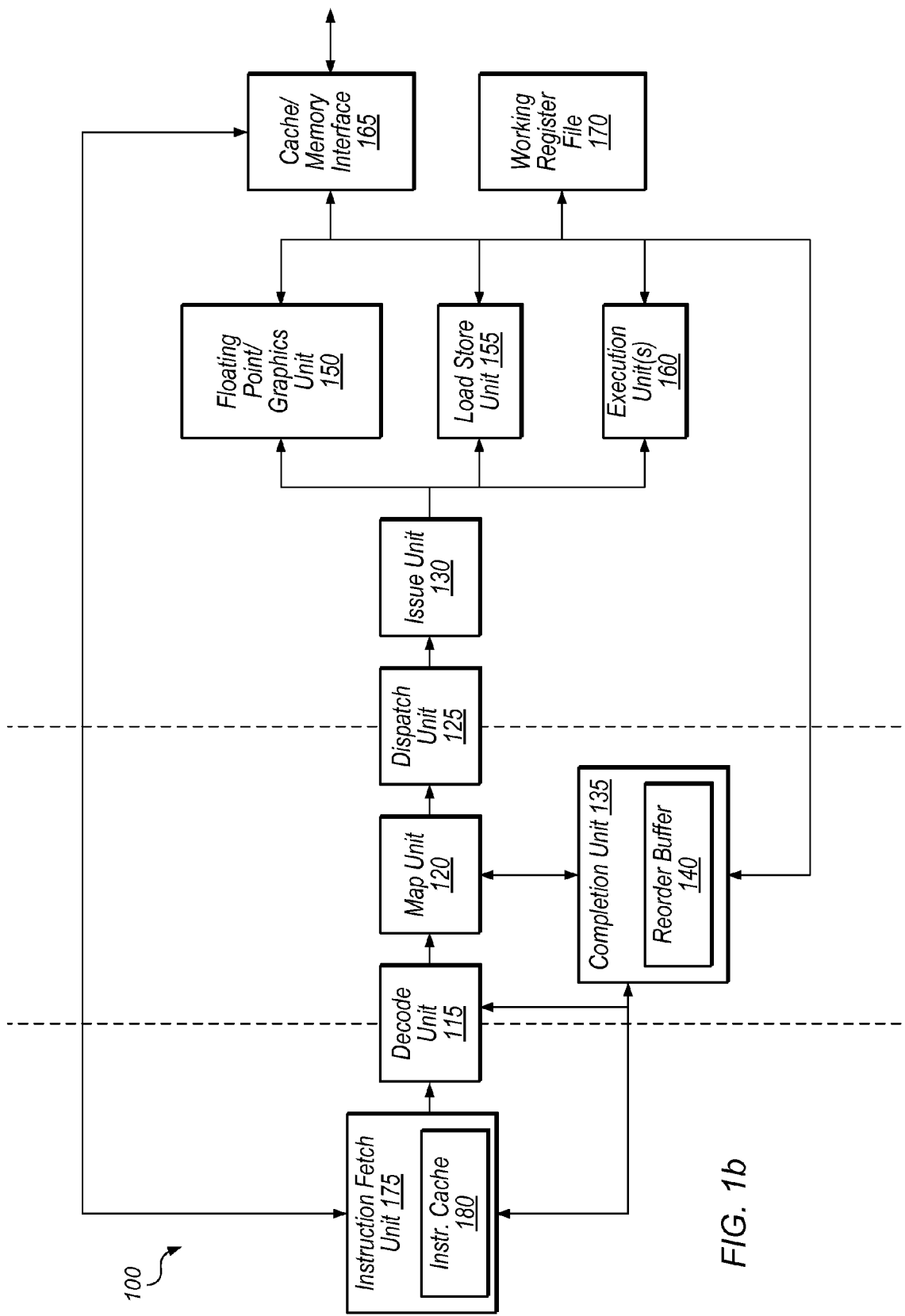
FIG. 1b is a block diagram illustrating one embodiment of a processor pipeline.

Turning now to FIG. 1b, a block diagram illustrating one embodiment of a pipeline of processor 100 is shown. Processor 100 includes instruction fetch unit (IFU) 175 which includes an instruction cache 180. IFU 175 is coupled to an exemplary instruction processing pipeline that begins with a decode unit 115 and proceeds in turn through a map unit 120, a dispatch unit 125, and issue unit 130. Issue unit 130 is coupled to issue instructions to any of a number of instruction execution resources: execution unit(s) 160, a load store unit (LSU) 155, and/or a floating-point/graphics unit (FGU) 150. These instruction execution resources are coupled to a working register file 170. Additionally, LSU 155 is coupled to cache/memory interface 165. Reorder buffer 140 is coupled to IFU 175, dispatch unit 125, working register file 170, and the outputs of any number of instruction execution resources.

In the following discussion, exemplary embodiments of each of the structures of the illustrated embodiment of processor 100 are described. However, it is noted that the illustrated embodiment is merely one example of how processor 100 may be implemented. Alternative configurations and variations are possible and contemplated.

Instruction fetch unit 175 may be configured to provide instructions to the rest of processor 100 for execution. The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

In one embodiment, IFU 175 is configured to fetch instructions from instruction cache 180 and buffer them for downstream processing, request data from a cache or memory through cache/memory interface 165 in response to instruction cache misses, and predict the direction and target of control transfer instructions (e.g., branches). In some embodiments, IFU 175 may include a number of data structures in addition to instruction cache 180, such as an instruction translation lookaside buffer (ITLB), instruction buffers, and/or structures configured to store state that is relevant to thread selection and processing (in multi-threaded embodiments of processor 100).

In one embodiment decode unit 115 is configured to prepare fetched instructions for further processing. Decode unit 115 may be configured to identify the particular nature of an instruction (e.g., as specified by its opcode) and to determine the source and destination registers encoded in an instruction, if any. In some embodiments, decode unit 115 is configured to detect certain dependencies among instructions and/or to convert certain complex instructions to two or more simpler instructions for execution. For example, in one embodiment, decode unit 115 is configured to decode certain multi-destination instructions into a plurality of single-destination operations as discussed above with reference to FIG. 1a. Consider, for example, a multiply instruction that specifies two destination registers R1 and R2 for storing the result of a multiply. In one embodiment, decode unit 115 may decode such an instruction into two single-destination operations, one specifying R1 as a destination register and the other specifying R2 as a destination register.

Register renaming may facilitate the elimination of certain dependencies between instructions (e.g., write-after-read or "false" dependencies), which may in turn prevent unnecessary serialization of instruction execution. In one embodiment, map unit 120 is configured to rename the architectural destination registers specified by instructions of a particular instruction set architecture (ISA) by mapping them to a physical register space, resolving false dependencies in the process. In some embodiments, map unit 120 maintains a mapping table that reflects the relationship between architectural registers and the physical registers to which they are mapped. Map unit 120 may also maintain a "free list" of available (i.e. currently unmapped) physical registers. In one embodiment, map unit 120 is configured to process single-destination operations, but is not configured to process multi-destination operations. This embodiment may consume less power and occupy less processor area than map unit implementations that are configured to process multi-destination operations or instructions.

Once decoded and renamed, instructions may be ready to be scheduled for performance. In the illustrated embodiment, dispatch unit 125 is configured to schedule (i.e., dispatch) instructions that are ready for performance and send the instructions to issue unit 130. In one embodiment, dispatch unit 125 is configured to maintain a schedule queue that stores a number of decoded and renamed instructions as well as information about the relative age and status of the stored instructions. For example, taking instruction dependency and age information into account, dispatch unit 125 may be configured to pick one or more oldest instructions that are ready for performance.

In one embodiment, dispatch unit 125 is configured to merge or fuse a plurality of single-destination operations into a multi-destination operation. For example, in embodiments of processor 100 in which decode unit 115 decodes multi-destination instructions as a plurality of single-destination operations, dispatch unit 125 may be configured to merge the plurality of single-destination operations into a single multi-destination operation that is only performed once, saving execution time compared to implementations where each of the plurality of single-destination operations is performed. Dispatch unit 125 may be configured to merge single-destination operations based on detecting an opcode or prefix in one or more of the single-destination operations. The term "opcode" refers to a particular set of bits that specifies an operation to be performed. Thus, an opcode may be used to indicate that merging or single-destination operations should be performed. An opcode may be used specify other information at the same time as, or instead of specifying that merging should be performed. The term "prefix" refers to a particular set of bits that modifies an operation. For example, one type of prefix indicates a number of bits to be used for operands of the operation. In various embodiments, opcodes and/or prefixes may encode various types of information, including indications that operations should be merged.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Issue unit 130 may be configured to provide instruction sources and data to the various execution units for picked (i.e. scheduled or dispatched) instructions. In one embodiment, issue unit 130 is configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, processor 100 includes a working register file 170 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 130 may proceed to one or more of the illustrated execution units to be performed. In one embodiment, each of execution unit(s) 160 is similarly or identically configured to perform certain integer-type instructions defined in the implemented ISA, such as arithmetic, logical, and shift instructions. In some embodiments, architectural and non-architectural register files are physically implemented within or near execution unit(s) 160. It is contemplated that in some embodiments, processor 100 may include any number of integer execution units, and the execution units may or may not be symmetric in functionality.

Load store unit 155 may be configured to process data memory references, such as integer and floating-point load and store instructions and other types of memory reference instructions. LSU 155 may include a data cache as well as logic configured to detect data cache misses and to responsively request data from a cache or memory through cache/memory interface 165. In one embodiment, a data cache in load store unit 155 is configured as a set-associative, write-through cache in which all stores are written to a higher-level (e.g., L2) cache regardless of whether they hit in the data cache. As noted above, the actual computation of addresses for load/store instructions may take place within one of the integer execution units, though in other embodiments, LSU 155 may implement dedicated address generation logic. In some embodiments, LSU 155 may implement a hardware prefetcher configured to predict and prefetch data that is likely to be used in the future, in order to increase the likelihood that such data will be resident in a data cache when it is needed.

In various embodiments, LSU 155 may implement a variety of structures configured to facilitate memory operations. For example, LSU 155 may implement a data TLB to cache virtual data address translations, as well as load and store buffers configured to store issued but not-yet-committed load and store instructions for the purposes of coherency snooping and dependency checking LSU 155 may include a miss buffer configured to store outstanding loads and stores that cannot yet complete, for example due to cache misses. In one embodiment, LSU 155 may implement a store queue configured to store address and data information for stores that have committed, in order to facilitate load dependency checking LSU 155 may also include hardware configured to support atomic load-store instructions, memory-related exception detection, and read and write access to special-purpose registers (e.g., control registers).

Floating-point/graphics unit (FGU) 150 may be configured to perform and provide results for certain floating-point and graphics-oriented instructions defined in the implemented ISA. For example, in one embodiment FGU 150 implements single- and double-precision floating-point arithmetic instructions compliant with the IEEE floating-point standards, such as add, subtract, multiply, divide, and certain transcendental functions.

In one embodiment, FGU 150, LSU 155, and or execution unit(s) 160 are configured to perform multi-destination instructions and operations. Thus, a plurality of single-destination operations split from a multi-destination instruction may be merged at an earlier pipeline stage into one or more multi-destination operations, which may be performed by one or more of FGU 150, LSU 155, and/or execution unit(s) 160.

In the illustrated embodiment, completion unit 135 includes reorder buffer (ROB) 140 and coordinates transfer of speculative results into the architectural state of processor 100. Entries in ROB 140 may be allocated in program order. Completion unit 135 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

In some embodiments, speculative results of instructions may be stored in ROB 140 before being committed to the architectural state of processor 100, and confirmed results may be committed in program order. Entries in ROB 140 may be marked as completed when their results are allowed to be written to the architectural state. Completion unit 135 may also be configured to coordinate instruction flushing and/or replaying of instructions. "Flushing," as used herein, refers to removing an instruction from execution in a processor pipeline; accordingly, execution of an instruction that is flushed is not completed. For example, an instruction may be flushed because it was speculatively fetched based on a mispredicted branch. "Replaying," as used herein, refers to re-performing a speculatively-performed instruction. For example, a speculatively-performed load from a particular location in memory may be re-performed in response to detecting a store to the particular location that is earlier in program order than the load. Flushing and replaying may involve rewinding execution of an instruction. "Rewinding," as used herein, refers to undoing operations performed during execution of an instruction. For example, rewinding may include un-mapping physical registers and destination registers, marking results as invalid, removing entries from ROB 140, etc.

For example, when instructions are rewound, completion unit 135 may be configured to free associated destination registers, e.g., by writing to a free list in map unit 120. For instructions that are not flushed, replayed or otherwise cancelled due to mispredictions or exceptions, instruction processing may end when instruction results have been committed. Completion unit 135 may indicate to map unit 120 that registers are free after completion of corresponding instructions. In one embodiment where decode unit 115 splits a multi-destination instruction into a plurality of single-destination operations, completion unit 135 is configured to allocate entries for the plurality of single-destination operations in ROB 140. Completion unit 135 may be configured to flush, retire, replay, or otherwise modify the entries in ROB 140 based on processing of the single-destination operations and/or processing of corresponding multi-destination operations.

Generally, some portions of the pipeline of FIG. 1*b* may be configured to process multi-destination operations, while other portions may be configured to process single-destination operations. Therefore, some elements of processor 100 may be configured to split multi-destination operations into a plurality of single-destination operations and other elements of processor 100 may be configured to merge a plurality of single-destination operations into one or more multi-destination operations. For example, as discussed above, in one embodiment, map unit 120 is configured to process single-destination operations but not multi-destination operations. Thus, in one embodiment, decode unit 115 is configured to decode a multi-destination instruction into a plurality of single-destination operations that are sent to map unit 120. Similarly, in one embodiment, dispatch unit 125 is configured to merge the plurality of single-destination operations into one or more multi-destination operations after processing of the single-destination operations in map unit 120. Such handling of multi-destination instructions may simplify hardware in map unit 120 and/or other processing elements without requiring separate performance of the plurality of single-destination operations (e.g., because the plurality of operations are merged into one or more multi-destination operations before they are sent to an execution resource). The vertical dashed lines in FIG. 1*b* indicate that, in one embodiment, map unit 120 and completion unit 135 are configured to process single-destination operations. In some embodiments, splitting and fusing of operations may occur multiple times.

E.g., an instruction may be split into multiple operations, then fused, then split again, then fused a second time.

In various embodiments, any of the units illustrated in FIG. 1b may be implemented as one or more pipeline stages, to form an instruction execution pipeline of a processing element that begins when thread fetching occurs in IFU 175 and ends with result commitment by completion unit 135. Depending on the manner in which the functionality of the various units of FIG. 1b is partitioned and implemented, different units may require different numbers of cycles to complete their portion of instruction processing. In some instances, certain units may require a variable number of cycles to complete certain types of operations.

Figure 2:
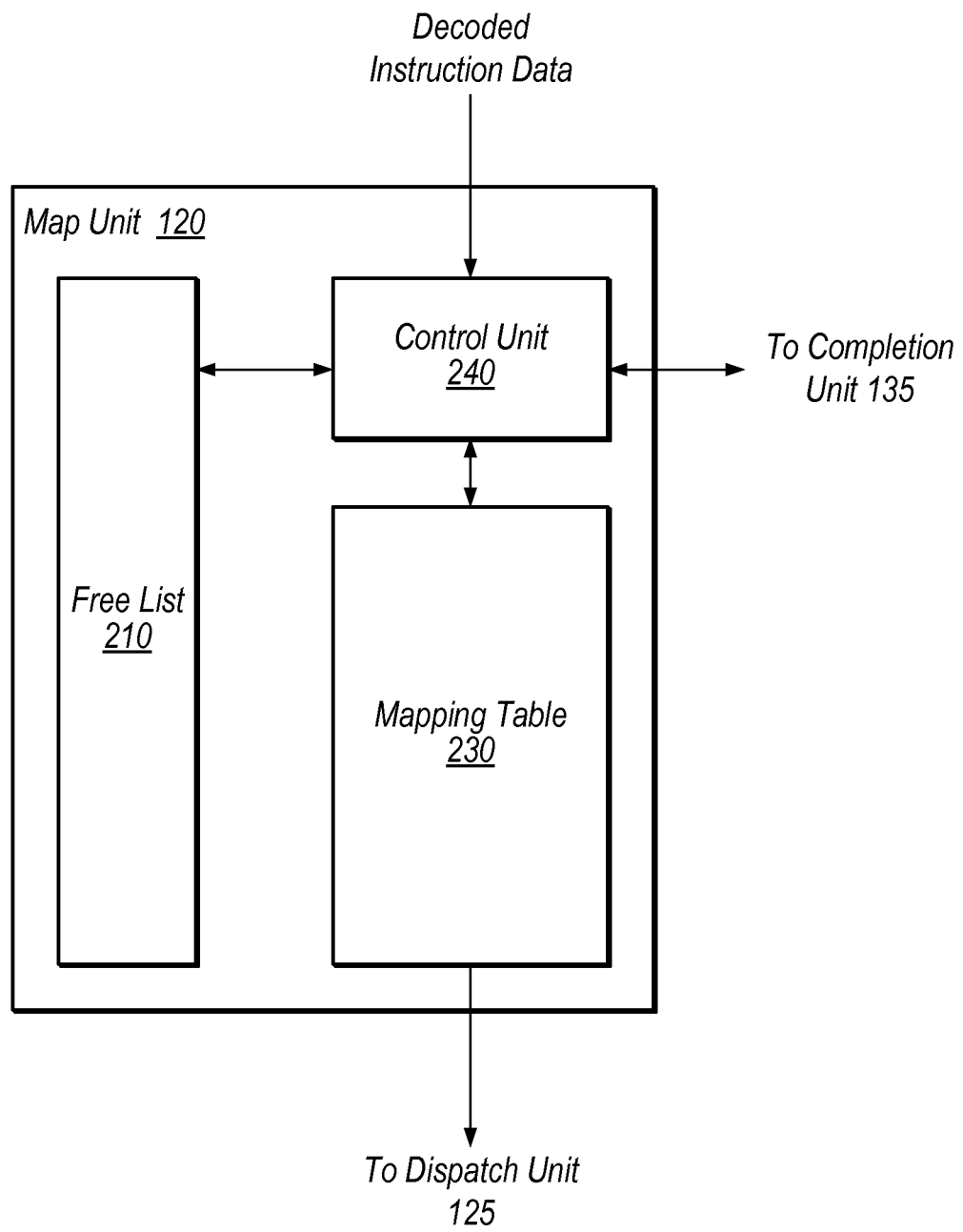
FIG. 2 is a block diagram illustrating one embodiment of a map unit.

Turning now to FIG. 2, a block diagram illustrating one embodiment of map unit 120 is shown. Map unit 120 is one example of a pipeline portion that may be simplified by configuring it to process single-destination operations but not multi-destination operations. In other embodiments, other pipeline portions may be simplified by configuring them to process single-destination operations that result from splitting a multi-destination instruction or operation.

In the illustrated embodiment, map unit 120 includes free list 210, mapping table 230, and control unit 240. Map unit 120 may receive decoded instruction data from decode unit 115 and completion data from completion unit 135. In one embodiment, decoded instruction data includes at most one destination architectural register for each operation. That is, in this embodiment, instruction data provided to map unit 120 corresponds to single-destination operations.

Control unit 240 may be configured to maintain a list of free physical registers in free list 210 and read from free list 210 in order identify a free physical register. Similarly, control unit 240 may be configured to write to free list 210 when registers become available because of rewinding or completion of corresponding instructions. Control unit 240 may be further configured to allocate entries in mapping table 230 to map architectural registers to free physical registers. Similarly, control unit 240 may be configured to de-allocate entries in mapping table 230 when corresponding instructions are completed or retired. Map unit 120 may send operation/instruction information from mapping table 230 to dispatch unit 125 for scheduling.

In embodiments in which map unit 120 is configured to process only single-destination operations, mapping table 230 and free list 210 may include a smaller number of read and write ports compared to methodologies in which map unit 120 is configured to process multi-destination instructions. In one embodiment, to map a given operation, control unit 240 is configured to read only one entry from free list 210 and allocate (write) only one entry in mapping table 230. Similarly, when a given operation completes or retires, control unit 240 is configured to write only one entry to free list 210 and de-allocate only one entry in mapping table 230. In this embodiment, map unit 120 is not configured to process multi-destination operations in a single cycle.

Free list 210 may be implemented using various methodologies. In one embodiment, free list 210 is a FIFO. In this embodiment, a read pointer points to a location in the FIFO storing information indicating a free physical register and a write pointer points to a location in the FIFO where information indicating the next physical register that becomes free should be stored. The information may be encoded using various encoding methodologies. For example, 8-bit values stored in FIFO entries may be used to differentiate among 256 physical registers. In this embodiment, the FIFO may be simplified if configured to handle single-destination operations compared to a FIFO configured to handle multi-destination operations. For example, (as mentioned above) consider a free list 210 implemented as a FIFO in a processor that is configured to map four decoded operations per cycle. If map unit 120 were configured to processes multi-destination operations with two destination registers, for example, free list 210 would require eight read ports. However, if map unit 120 is configured to process single-destination operations and is not required to handle multi-destination operations, free list 210 requires only four read ports. Similarly, a free list 210 that is not required to handle multi-destination instructions may include only a fraction of write ports compared to implementations that handle multi-destination instructions. Note that write ports may be used to write entries indicating registers that become available after performance of corresponding operations.

In another embodiment, free list 210 is a vector. In this embodiment, each bit in the vector corresponds to a physical register. In this embodiment, hardware savings may also be realized by splitting multi-destination instructions into a plurality of single-destination operations before handling in map unit 120. For example, the vector may be split into multiple ranges to allow for multiple reads from the vector in the same cycle. Handling multi-destination operations may require a multiple number of ranges to read multiple free registers for a multi-destination at a time, requiring more hardware and possibly causing inefficient use of physical registers in this embodiment. Further, more decoders may be required to decode physical registers into the appropriate location in the vector in order to write free registers to the vector. Thus, a free list 210 that is a vector in a map unit 120 configured to handle single-destination operations may result in reduced hardware and/or power consumption compared to implementations that handle multi-destination operations.

In various embodiments, free list 210 may be implemented using any appropriate methodology including a queue, stack, etc. The above embodiments are described in order to demonstrate that free list 210 may be simplified in embodiments where map unit 120 does not process multi-destination instructions.

In one embodiment, completion unit 135 may be configured to allocate entries in ROB 140 for single-destination instructions and not multi-destination instructions. Therefore, when a merged multi-destination operation completes, completion unit 135 may be configured to mark a plurality of corresponding single-destination operation entries in ROB 140 as complete. Similarly, if a multi-destination operation is flushed, completion unit 135 may be configured to flush a plurality of corresponding single-destination operation entries in ROB 140. Storing entries for single-destination operations in ROB 140 rather than multi-destination operations facilitates reduced hardware (e.g., a reduced number of write ports) in free list 210 and mapping table 230 because completing and rewinding instructions includes freeing associated registers and de-allocating associated register mappings. For example, completion unit 135 may write to free list 210 to indicate that a plurality of registers corresponding to a plurality of single-destination operations have become available based on completion of a multi-destination operation associated with the plurality of single-destination operations.

In general, processing only single-destination operations in some embodiments of processing elements such as map unit 120 may decrease performance of those elements. For example, map unit 120 may map fewer instructions per unit processor cycle on average in such embodiments than a map unit that processes multi-destination instructions. However, in embodiments of processor 100 in which map unit 120 is not a bottleneck in a processor pipeline, overall performance of processor 100 may not be affected. Further, using a mapping table as an example, an appropriate number of read/write ports can be implemented for single-destination instructions to obtain desired performance without requiring a multiple of that number for multi-destination instructions. Finally, any reduction in processor performance may be considered an acceptable tradeoff in light of reduced processor area and power consumption.

Turning now to FIG. 3a, a flow diagram illustrating one exemplary embodiment of a method 300 for processing a multi-destination instruction is shown. The method shown in FIG. 3a may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 310.

At block 310 a multi-destination instruction is split into a plurality of single-destination operations in a first pipeline portion. In one embodiment the first pipeline portion may comprise a decode unit. Flow proceeds to block 320.

At block 320, the plurality of single-destination operations are separately processed in a second pipeline portion. The second pipeline portion may include a map unit, such as the map unit 120 described above with reference to FIGS. 1b and 2. Separately processing the plurality of single-destination operations may allow the second pipeline portion to occupy less processor area and consume less power compared to pipeline portions that process multi-destination operations. Flow proceeds to block 330.

At block 330, the plurality of single destination operations are merged into a single multi-destination operation. The single multi-destination operation may be available for further processing. For example, the single multi-destination operation may be performed by an execution subsystem of processor 100, such as LSU 155 or execution unit(s) 160. Flow ends at block 330. In some instances, the method of FIG. 3a may reduce processor area and power consumption with little to no reduction in processor performance.

Turning now to FIG. 3b, a flow diagram illustrating another exemplary embodiment of a method 350 for processing a multi-destination instruction is shown. The method shown in FIG. 3b may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 360.

At block 360 a multi-destination operation is split into N single-destination operations in a first pipeline portion, where N is greater than one. This step may be similar to the step described above with reference to block 310 of FIG. 3a. Flow proceeds to block 370.

At block 370 the N single-destination operations are processed separately in a second pipeline portion. This step may be similar to the step described above with reference to block 320 of FIG. 3a. Flow proceeds to block 380.

At block 380 the N single-destination operations are merged into M multi-destination operations, where M is greater than or equal to one and less than N. For example, each multi-destination instruction may indicate two destination registers corresponding to destination registers indicated by two of the N single-destination operations. The M multi-destination operations may be available for further processing. For example, the M multi-destination operation may be performed by an execution subsystem of processor 100, such as LSU 155 or execution unit(s) 160. Flow ends at block 380. In some instances, the method of FIG. 3b may reduce processor area and power consumption with little to no reduction in processor performance.

Figure 4:
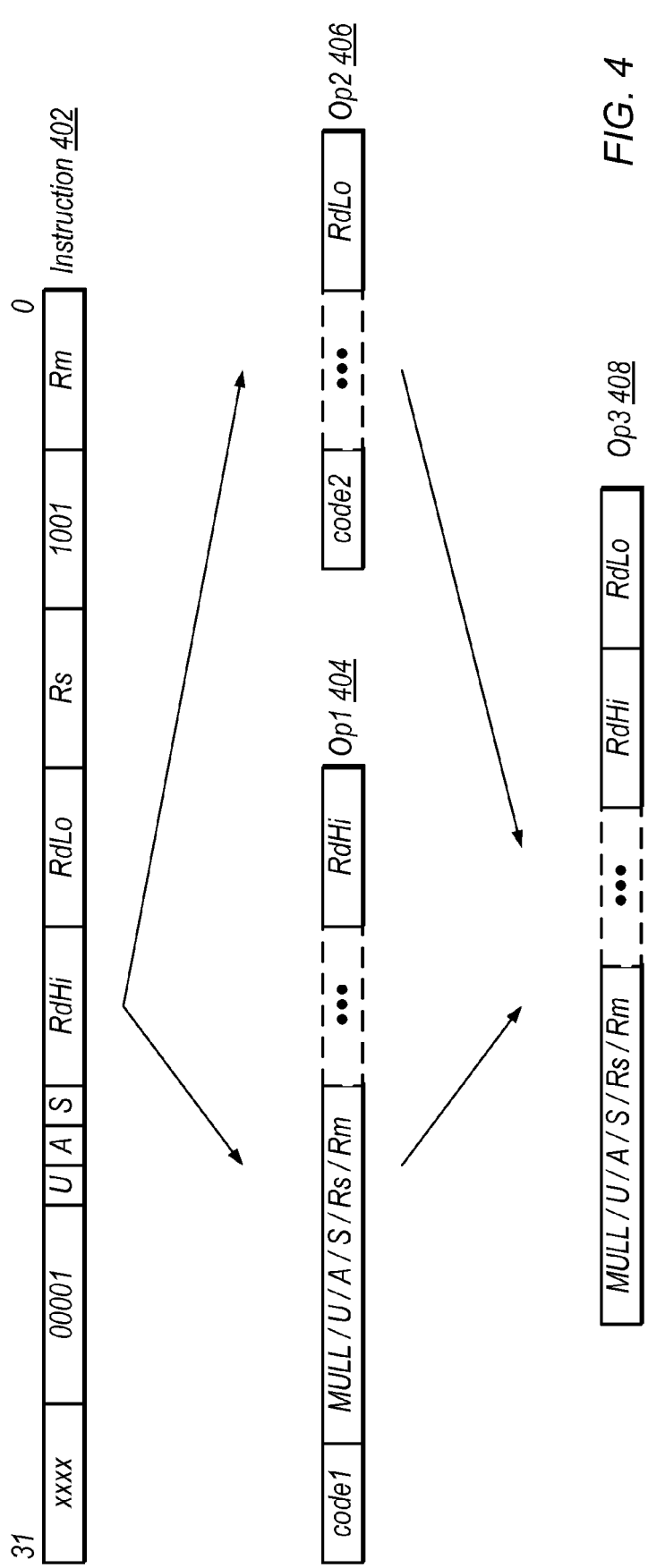
FIG. 4 is a diagram illustrating exemplary processing of a long multiply instruction.

Turning now to FIG. 4, a diagram illustrating exemplary processing of an ARM® long multiply instruction is shown. In this exemplary embodiment of a multi-destination instruction, instruction 402 includes 32 bits of instruction data. In the illustrated embodiment, bits 31-28 are designated as "xxxx" to indicate that the value of those bits is undetermined or ignored in instruction 402. Bits 27-23 have a value of "00001" and bits 7-4 have a value of "1001" which indicates that the instruction is a long multiply or multiply and accumulate instruction. The U bit (bit 22) indicates whether the multiplication is signed or unsigned. The A bit (bit 21) indicates whether the result of the multiplication should be placed directly in the destination registers or should be added to the value in the destination registers, i.e., "accumulated." Assume that in the example of FIG. 4, the A bit indicates that the result of the multiplication should be placed directly in the destination registers. The S bit (bit 20) indicates whether condition flags should be updated based on performance of the multiply. The RdHi field indicates a destination register for storing the upper 32 bits of the multiply result. The RdLo field indicates a destination register for storing the lower 32 bits of the multiply result. The Rs and Rm fields indicate source registers holding operands for the multiply operation.

In the illustrated example, instruction 402 is split (e.g. at a decode unit) into two single-destination operations: op1 and op2. In this embodiment, op1 404 includes at least an opcode code1, a field indicating parameters of the operation (e.g., information related to MULL/U/A/S/Rs/Rm), and an RdHi field indicating a destination register for storing the upper 32 bits of the multiply result i.e., the most significant 32 bits. In this embodiment, op2 404 includes at least an opcode code2 and an RdLo field indicating a destination register for storing the lower 32 bits of the multiply result, i.e., the least significant 32 bits. In this embodiment, op2 406 does not include information about the multiplication operation, so op2 406 may be said to serve as a placeholder for the destination register indicated by RdLo. In other embodiments, op2 406 may contain the same information as op1 404 except for the different destination registers. In one embodiment, opt1 404 and op2 406 include the same number of bits. In other embodiments, op1 404 and op2 406 include different numbers of bits.

Opt 404 and op2 406 may be separately processed in one or more pipeline portions. For example, map unit 120 may read from free list 210 in order to map available physical registers to the architectural registers indicated by RdHi and RdLo and may process op1 404 and op2 406 separately when performing this functionality. Because each of op1 404 and op2 406 includes only a single destination register, map unit 120 may be configured to read and/or write only one register from free list 210 and mapping table 230 for each operation processed.

In the illustrated embodiment, op1 404 and op2 406 are merged into a multi-destination operation op3 408. In one embodiment, this merging may be performed based on an opcode in the single-destination operations, such as code1 of opt 404 and code 2 of op2 406. In one embodiment, the merging may take place at a dispatch stage of a processor pipeline. For example, dispatch unit 125 may receive op1 404 and detect code1. Based on code1, dispatch unit 125 may look for an instruction with opcode "code 2" to merge with op1 404.

In another embodiment, one or more processing elements (such as map unit 120 and dispatch unit 125, for example) may process single-destination operations consecutively (i.e. in a given order with no other operations between the particular operations). For example, the particular operations may be mapped consecutively in map unit 120 and may be stored adjacently in a dispatch queue of dispatch unit 125. Thus, a processing element such as dispatch unit 125 may merge op2 406 with op1 404 based on detecting code1 and retrieve consecutive operations. For example, code1 may indicate that dispatch unit 125 should merge one other consecutive operation (op2 406 in this case). In other embodiments where more single-destination operations are merged, an opcode may indicate various numbers of consecutive operations to merge, or otherwise indicate other operations to merge using various encodings. In various embodiments, various opcodes, prefixes, indicators, operation ordering, and so on may be used to identify single-destination operations to merge into multi-destination operations for further processing.

In the illustrated embodiment, op3 408 includes at least a field indicating parameters of the operation (e.g., information corresponding to MULL/U/A/S/Rs/Rm), an RdHi field indicating a destination register for storing the upper 32 bits of the multiply result, and an RdLo field indicating a destination register for storing the lower 32 bits of the multiply result. In this embodiment, when op3 408 arrives at a processor execution unit, op3 408 is performed as a mult-destination operation, and results of the multiply are written to registers indicated by RdHi and RdLo. In this embodiment, elements such as the execution unit and a processor register file may include a number of read and/or write ports or other circuitry that allows those elements to perform multi-destination operations.

In this embodiment, when op3 408 has been performed, completion unit 135 is configured to mark entries for op1 404 and op2 406 in ROB 140 as completed. Completion unit 135 may identify single-destination instructions to be marked as complete or to retire based on an opcode of operations, ordering of operations, and so on as discussed above with reference to identifying single-destination operations for merging. Similarly, when a multi-destination instruction or operation is to be rewound, entries in ROB 140 for single-destination operations corresponding to the multi-destination instruction or operation may be processed appropriately and may be identified using an opcode, operation ordering, and so on as described above.

Figure 5:
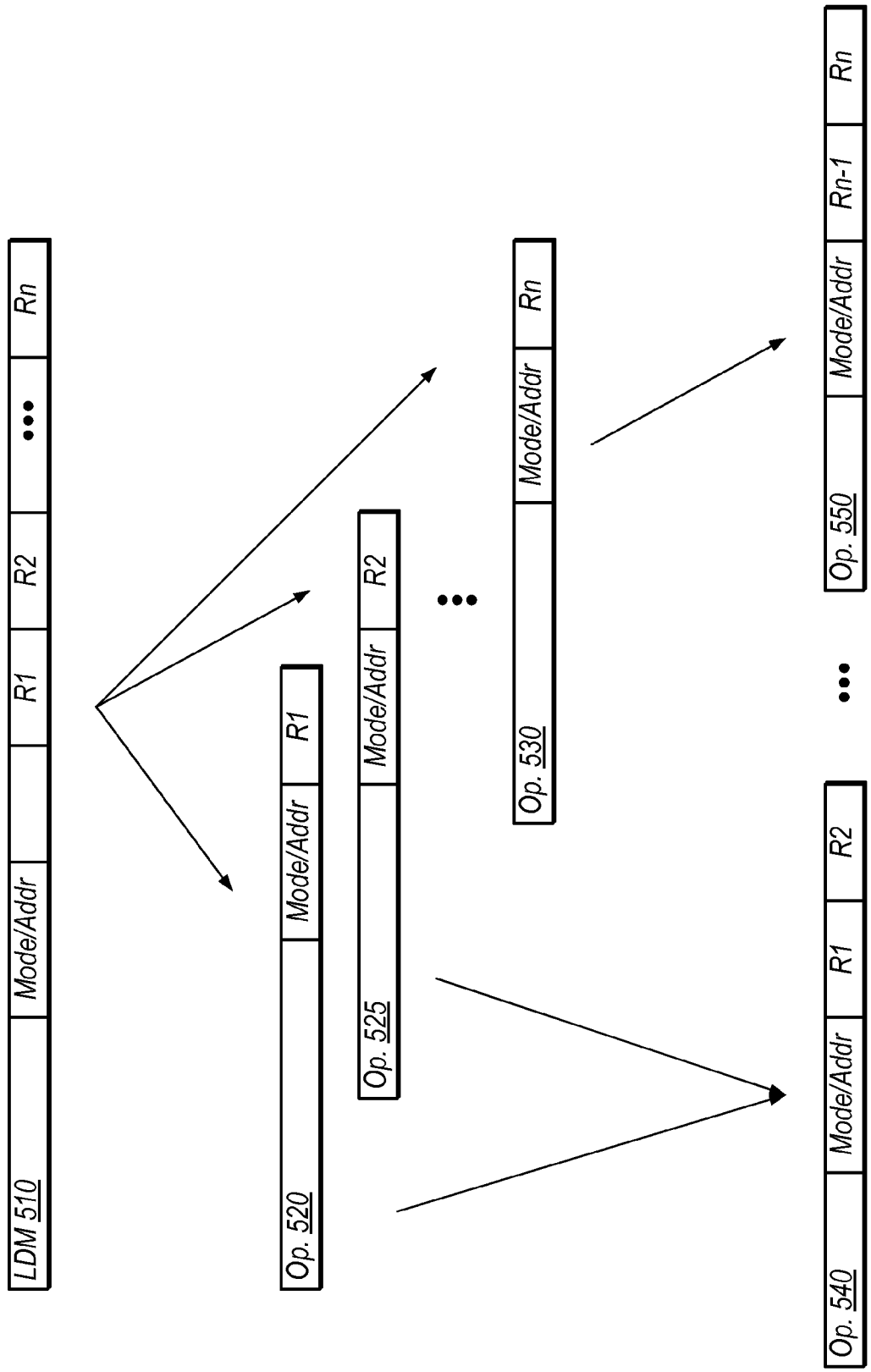
FIG. 5 is a diagram illustrating exemplary processing of a load-multiple instruction.

Turning now to FIG. 5, a diagram illustrating exemplary execution of a load-multiple instruction is shown. FIG. 5 is included to illustrate one embodiment in which a plurality of single-destination operations may be merged into more than one multi-destination operation.

Load-multiple (LDM) instruction 510 includes mode/addr information, and indicates R1 through Rn as destination registers. In one embodiment, the mode/addr information indicates a starting address for the load operation. LDM 510 may indicate a base register in the mode/addr information that stores the starting address. The mode/addr information may also indicate an addressing mode, such as increment before, increment after, decrement before, decrement after, etc.

In the illustrated embodiment, LDM 510 is split into a plurality of single-destination operations including operations 520, 525 and 530. In the illustrated embodiment, each of the single-destination operations includes the mode/addr information. In other embodiments, only one single-destination operation or only a subset of the single-destination operations may include the mode/addr information. In some embodiments, the mode/addr information in each of the single-destination operations may be modified and may be different in value and/or encoding than the mode/addr information of LDM 510. Each of the single-destination operations indicates a single destination register. For example, operation 520 indicates register R1.

In the illustrated embodiment, operation 520 and operation 525 are merged into multi-destination operation 540. Similarly, operation 530 and another single-destination operation (not shown) are merged into operation 550. Multi-destination operations 540 and 550 each include two destination registers. Such operations may be implemented in embodiments of processor 100 that include a LSU 155 and/or working register file 170 that are capable of processing/performing a load operation with two destination operations. For example, working register file 170 may include two write ports for each operation for which working register file 170 stores results. In various embodiments, single-destination operations may be merged into various numbers of multi-destination operations each having various numbers of destination registers. For example, merged multi-destination load operations may include 3, 4 or 8 destination registers, or any other appropriate number.

Generalizing the above, a multi-destination instruction may be split into N single-destination operations, where N is an integer greater than 1. E.g., LDM instruction 510 is split into N=3 single-destination operations 520, 525, and 530. The N single-destination operations may be merged into M multi-destination operations, where M is an integer greater than or equal to 1 and less than N. E.g., the operations 520, 525, and 530 are merged into M=2 multi-destination operations 540 and 550. The N single-destination operations may be separately processed in a portion of a processor pipeline such as map unit 120, for example. The M multi-destination operations may be performed by an execution subsystem of a processing element such as execution unit(s) 160 or LSU 155, for example.

Performance of the M multi-destination operations may improve processor performance compared to performing the N single-destination operations. Further, processing the N single-destination operations separately in a portion of a processor pipeline may allow for reduced hardware and/or power consumption in processor 100.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
splitting, in a first portion of a pipeline of a processing element, a multi-destination instruction into a plurality of single-destination operations;
processing, in a second portion of the pipeline, the plurality of single-destination operations;
merging, in a third portion of the pipeline, the plurality of single-destination operations into a single multi-destination operation; and
after the merging, performing the single multi-destination operation in a fourth portion of the pipeline.

2. The method of claim 1, wherein the multi-destination instruction is a multiply instruction that specifies two destination registers.

3. The method of claim 1, wherein the multi-destination instruction is a load-multiple instruction that specifies a plurality of destination registers and one or more memory locations.

4. The method of claim 1, wherein the merging is based on an opcode of one of the plurality of single-destination operations.

5. A processor, comprising:
a first pipeline portion configured to split a multi-destination instruction into a plurality of single-destination operations;
a second pipeline portion configured to process the plurality of single-destination operations;
a third pipeline portion, configured to merge the plurality of single-destination operations into a single multi-destination operation; and
an execution subsystem, configured to perform the single multi-destination operation.

6. The processor of claim 5, wherein the first pipeline portion comprises a decode unit, wherein the second pipeline portion comprises a mapping unit, and wherein the third pipeline portion comprises a dispatch unit.

7. The processor of claim 5, further comprising a reorder buffer:
wherein the reorder buffer is configured to allocate entries for the plurality of single-destination operations; and
wherein the reorder buffer is configured to indicate that the plurality of single-destination operations are complete in response to determining that the single multi-destination operation is complete.

8. The processor of claim 5, wherein the plurality of single-destination operations are processed consecutively in the second pipeline portion.

9. A method, comprising:
splitting, in a first portion of a pipeline of a processing element, a multi-destination instruction into N single-destination operations, wherein N is an integer greater than 1;
processing, in a second portion of the pipeline, the N single-destination operations;
merging, in a third portion of the pipeline, the N single-destination operations into M multi-destination operations, wherein M is an integer greater than or equal to 1 and less than N; and
performing the M multi-destination operations.

10. The method of claim 9, further comprising allocating entries in a reorder buffer for the N single-destination operations.

11. The method of claim 10, further comprising de-allocating the entries in the reorder buffer for the N single-destination operations based on completion of the single multi-destination operation.

12. The method of claim 10, further comprising rewinding execution of the single-destination operations using the allocated entries in the reorder buffer.

13. The method of claim 12, wherein said rewinding comprises removing a plurality of entries in a mapping table and adding entries for a plurality of freed registers to a free list.

14. A processor, comprising:
a pipeline portion configured to process single-destination operations, but not multi-destination operations;
a first processing element configured to convert a multi-destination operation into N single-destination operations and provide the N single-destination operations to the pipeline portion, wherein N is greater than 1;
a second processing element, configured to receive the N single-destination operations from the pipeline portion and to merge the N single-destination operations into M multi-destination operations, wherein M is greater than or equal to 1 and less than N; and
an execution subsystem, configured to perform the M multi-destination operations.

15. The processor of claim 14,
wherein the pipeline portion comprises a map unit configured to maintain a mapping table to map architectural registers to physical registers; and
wherein, to map each of the N single-destination operations, the map unit is configured to write only one entry to the mapping table.

16. The processor of claim 15, wherein, after completion of the M multi-destination operations, the map unit is configured to de-allocate only one entry from the mapping table for each of the N single-destination operations.

17. The processor of claim 14, wherein the pipeline portion includes circuitry configured to maintain a list of available physical registers, wherein, for a given single-destination operation, the processor is configured to read only one entry from the list.

18. The processor of claim 17, wherein, after completion of one of the M multi-destination operations, the processor is configured to write to the list for a plurality of registers associated with a plurality of the N single-destination operations to indicate that the plurality of registers have become available, wherein the plurality of the N single-destination operations correspond to the one of the M multi-destination operations.

19. A processor, comprising:
a first pipeline portion configured to split an instruction that specifies N destination registers into N operations that each specify a single destination register, wherein N is greater than 1;
a second pipeline portion configured to process the N operations;
a third pipeline portion configured to merge the N operations into M operations, wherein one or more of the M operations specifies a plurality of destination registers, wherein M is greater than or equal to 1 and less than N; and
a fourth pipeline portion configured to execute the M operations.

20. The processor of claim 19, wherein the third pipeline portion is configured to merge the N operations into M operations in response to detecting an opcode of one of the N operations.

21. The processor of claim 20, wherein the opcode specifies how many of the N operations to merge into each of the M operations.

22. The processor of claim 20, wherein at least a portion of the second pipeline portion is configured to process the N operations consecutively.

23. The processor of claim 19, wherein the instruction is a load-multiple instruction, wherein each of the M operations specifies two destination registers.

* * * * *

UNITED STATES PATENT AND TRADEMARK OFFICE
CERTIFICATE OF CORRECTION

PATENT NO. : 9,223,577 B2  
APPLICATION NO. : 13/627884  
DATED : December 29, 2015  
INVENTOR(S) : John H. Mylius et al.

Page 1 of 1

It is certified that error appears in the above-identified patent and that said Letters Patent is hereby corrected as shown below:

In the claims:

Claim 1, Column 15, Lines 11-12, please delete "after the merging, performing the single multi-destination operation in a fourth portion of the pipeline." and substitute -- after the merging, performing the single multi-destination operation using at least one of an integer unit, a floating-point unit, or a load-store unit included in an execution subsystem of the pipeline. --

Claim 5, Column 15, Lines 32-33, please delete "an execution subsystem, configured to perform the single multi-destination operation." and substitute -- an execution subsystem that includes at least one of an integer unit, a floating-point unit, or a load-store unit and that is configured to perform the single multi-destination operation. --

Claim 9, Column 15, Line 60, please delete "performing the M multi-destination operations." and substitute -- performing, by an execution unit, the M multi-destination operations as specified by respective opcodes associated with ones of the M multi-destination operations. --

Claim 14, Column 16, Lines 19-20, please delete "an execution subsystem, configured to perform the M multi-destination operations." and substitute -- an execution unit configured to perform one or more operations specified by respective opcodes associated with ones of the M multi-destination operations. --

Claim 19, Column 16, Lines 57-58, please delete "a fourth pipeline portion configured to execute the M operations." and substitute -- a fourth pipeline portion that includes at least one of an integer unit, a floating-point unit, or a load-store unit configured to perform the M operations --

Signed and Sealed this  
Fourteenth Day of June, 2016

Michelle K. Lee  
*Director of the United States Patent and Trademark Office*